(12) United States Patent
Harigae

(10) Patent No.: US 10,671,335 B2
(45) Date of Patent: Jun. 2, 2020

(54) IMAGE FORMING APPARATUS, INFORMATION PROCESSING APPARATUS, AND IMAGE FORMING SYSTEM WITH SWITCHABLE CONNECTION INTERFACES

(71) Applicant: TOSHIBA TEC KABUSHIKI KAISHA, Shinagawa-ku, Tokyo (JP)

(72) Inventor: Makoto Harigae, Shinagawa Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/054,592

(22) Filed: Aug. 3, 2018

(65) Prior Publication Data
US 2020/0042262 A1 Feb. 6, 2020

(51) Int. Cl.
*H04W 4/00* (2018.01)
*G06F 3/12* (2006.01)
*H04N 1/00* (2006.01)

(52) U.S. Cl.
CPC ....... *G06F 3/1292* (2013.01); *H04N 1/00307* (2013.01); *H04N 2201/0094* (2013.01)

(58) Field of Classification Search
None
See application file for complete search history.

(56) References Cited

U.S. PATENT DOCUMENTS

| 2016/0004497 A1* | 1/2016 | Nishi | H04W 76/15 358/1.15 |
| 2016/0105826 A1* | 4/2016 | Matsunaga | H04W 76/11 455/436 |
| 2017/0099570 A1* | 4/2017 | Yamada | H04W 4/80 |

\* cited by examiner

*Primary Examiner* — Andrew H Lam
(74) *Attorney, Agent, or Firm* — Foley & Lardner LLP

(57) ABSTRACT

An image forming apparatus includes: an image forming unit configured to form an image on a print medium based on print data supplied from an information processing apparatus; a first communication interface configured to perform wireless communication with the information processing apparatus by a first communication method in which the number of connectable apparatuses is set; a second communication interface configured to perform wireless communication with the information processing apparatus by a second communication method; and a system controller. The system controller is configured to cause the second communication interface to transmit a notification to the information processing apparatus when the number of apparatuses which are connected by the first communication interface has reached the number of connectable apparatuses, the notification representing that the number of apparatuses which are connected by the first communication interface has reached the number of connectable apparatuses.

15 Claims, 7 Drawing Sheets

IMAGE FORMING APPARATUS, INFORMATION PROCESSING APPARATUS, AND IMAGE FORMING SYSTEM WITH SWITCHABLE CONNECTION INTERFACES

FIELD

Embodiments described herein relate generally to an image forming apparatus, an information processing apparatus, and an image forming system.

BACKGROUND

An image forming system includes an information processing apparatus and an image forming apparatus. The information processing apparatus transmits print data to the image forming apparatus. The image forming apparatus forms an image on a print medium based on the received print data. The information processing apparatus transmits the print data to the image forming apparatus, for example, by wireless communication. For example, as a wireless communication method, various standards such as Wi-Fi Direct (registered trademark) and Bluetooth (registered trademark) are generally used. Since Wi-Fi Direct has a communication speed faster than that of Bluetooth, Wi-Fi Direct is preferably used for transmission of the print data from the information processing apparatus to the image forming apparatus.

In Wi-Fi Direct, for example, the image forming apparatus functions as an access point (AP), and the information processing apparatus accesses the AP. Thus, communication can be performed. In Wi-Fi Direct, there is an upper limit on the number of apparatuses that can be simultaneously connected to the AP. In a state where the number of apparatuses connected to the AP reaches the upper limit, when an access request is received from an apparatus which is not connected to the AP, the image forming apparatus functioning as an AP cannot transmit a response to the access request. For this reason, there is a problem that the apparatus from which the access request is transmitted cannot recognize a reason of a connection error.

DETAILED DESCRIPTION

In general, according to one embodiment, an image forming apparatus includes: an image forming unit configured to form an image on a print medium based on print data supplied from an information processing apparatus; a first communication interface configured to perform wireless communication with the information processing apparatus by a first communication method in which the number of connectable apparatuses is set; a second communication interface configured to perform wireless communication with the information processing apparatus by a second communication method; and a system controller. The system controller is configured to cause the second communication interface to transmit a notification to the information processing apparatus when the number of apparatuses which are connected by the first communication interface reaches the number of connectable apparatuses, the notification representing that the number of apparatuses which are connected by the first communication interface reaches the number of connectable apparatuses.

Hereinafter, an image forming apparatus, an information processing apparatus, and an image forming system according to an embodiment will be described with reference to the drawings.

Figure 1:
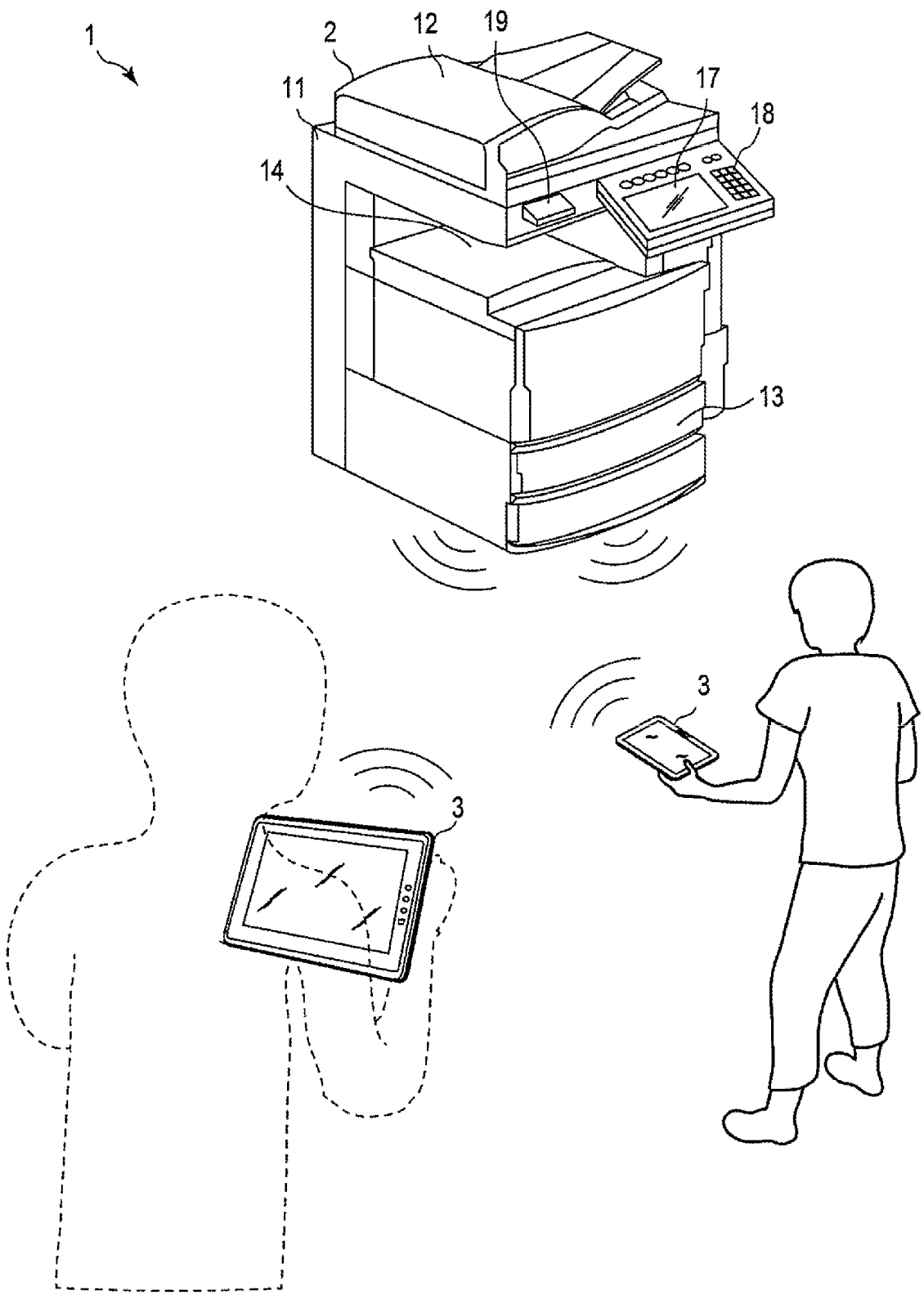
FIG. 1 is an explanatory diagram showing an example of a configuration of an image forming system according to an embodiment.
Figure 2:
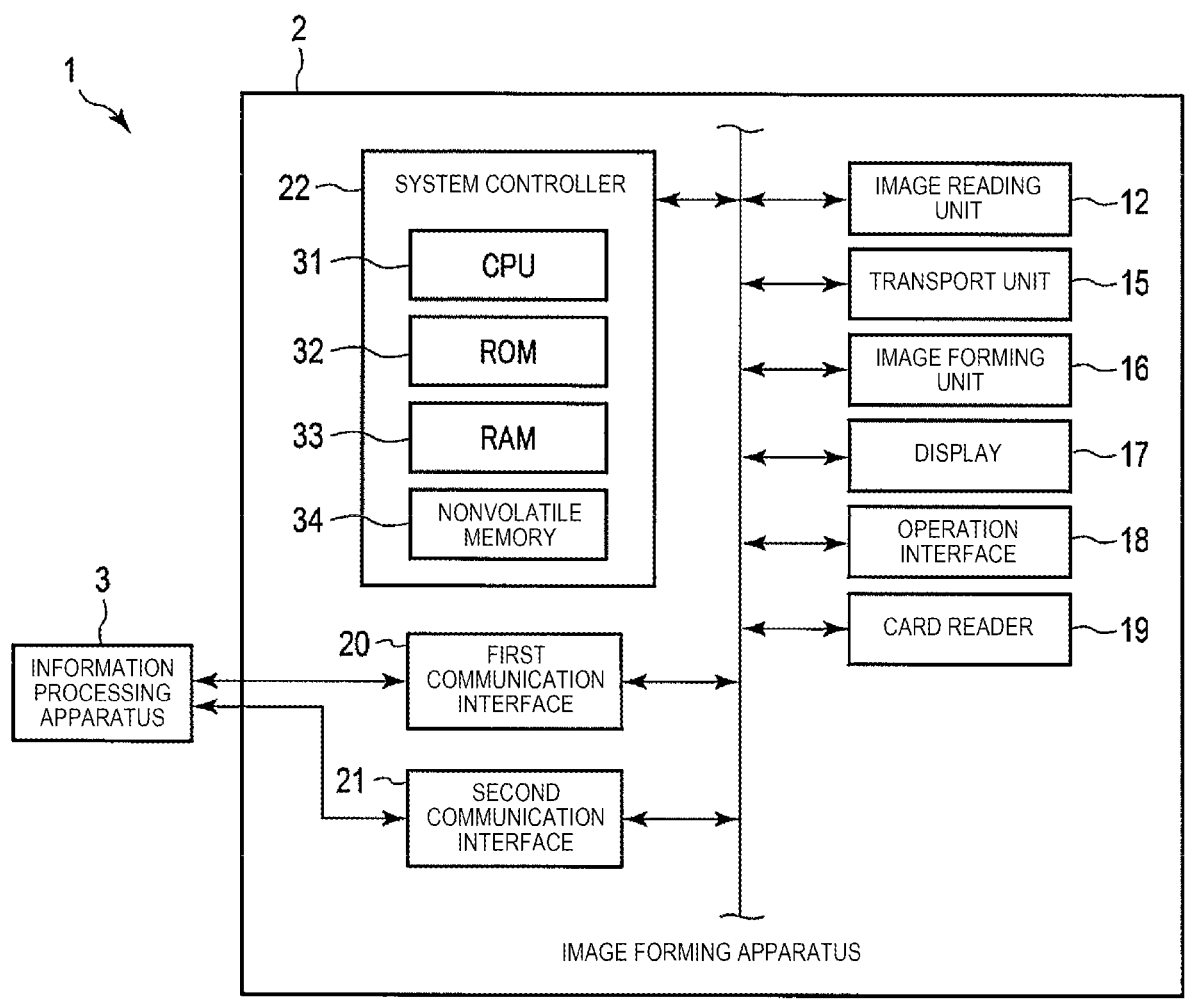
FIG. 2 is an explanatory diagram showing an example of a configuration of an image forming apparatus according to an embodiment.
Figure 3:
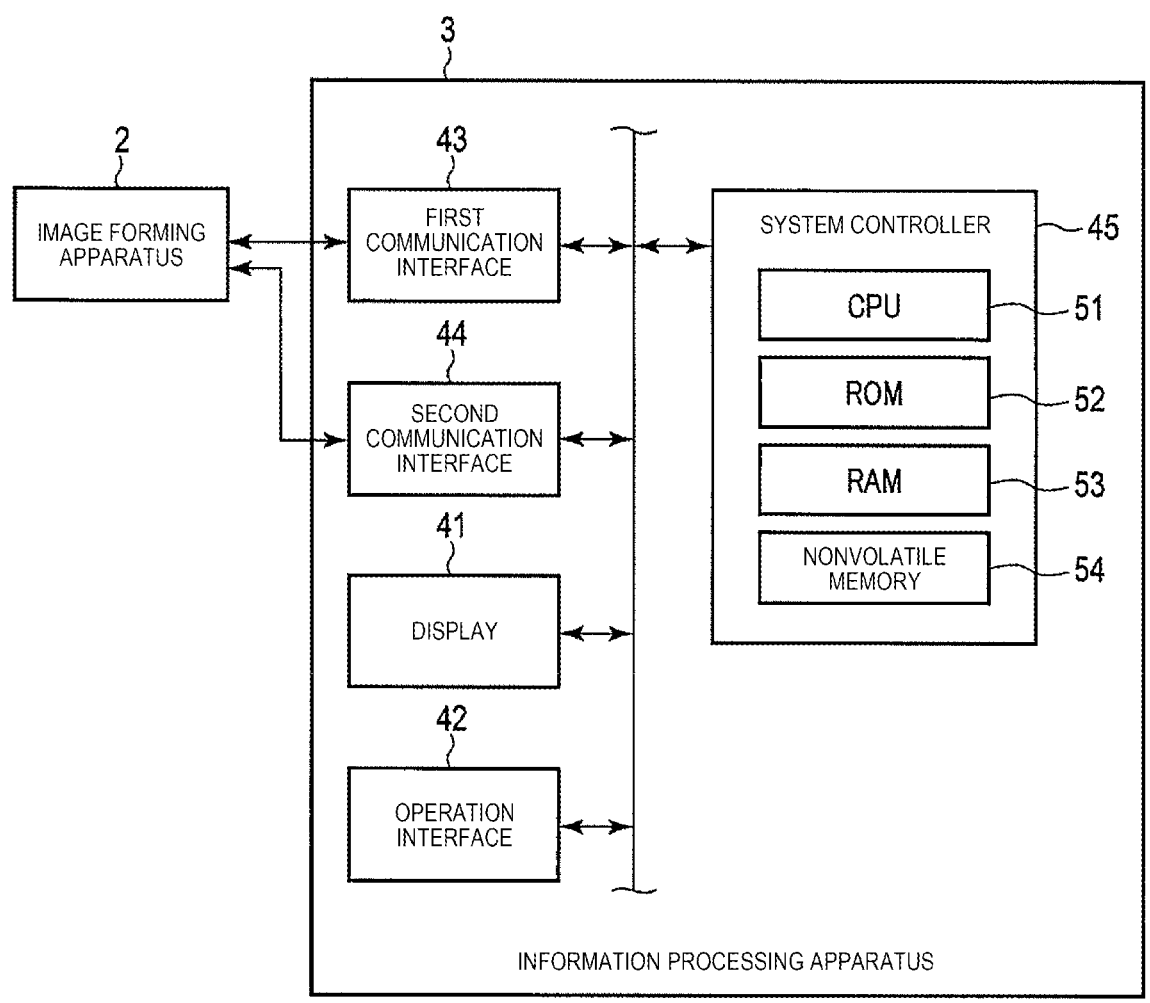
FIG. 3 is an explanatory diagram showing an example of a configuration of an information processing apparatus according to an embodiment.

FIG. 1 is an explanatory diagram showing an example of an image forming system 1 according to an embodiment. FIG. 2 is an explanatory diagram showing an example of a configuration of an image forming apparatus 2. FIG. 3 is an explanatory diagram showing an example of a configuration of an information processing apparatus 3.

An image forming system 1 includes an image forming apparatus 2 and a plurality of information processing apparatuses 3. Based on print data supplied from the information processing apparatus 3 to the image forming apparatus 2, the image forming system 1 forms an image on a print medium by the image forming apparatus 2, and discharges the print medium on which an image is formed.

The information processing apparatus 3 supplies print data to the image forming apparatus 2. The information processing apparatus 3 is, for example, a mobile apparatus such as a notebook PC, a smartphone, or a tablet PC.

The image forming apparatus 2 is, for example, a multi-function printer (MFP) that performs various processing such as image formation while transporting a recording medium such as a print medium. The image forming apparatus 2 is, for example, a solid-state printer using an LED array (for example, an LED printer) that performs various processing such as image formation while transporting a recording medium such as a print medium. In addition, the image forming apparatus 2 may be an ink jet type printer using an ink jet head (ink jet printer) that ejects an ink or another type of printer.

The image forming apparatus 2 charges a photoconductive drum, and irradiates the photoconductive drum with light corresponding to print image data (print data), thereby forming an electrostatic latent image on the photoconductive drum. The image forming apparatus 2 adheres toner to the latent image formed on the photoconductive drum, transfers the toner adhered to the latent image onto the print medium, and forms a toner image on the print medium. In addition, the image forming apparatus 2 fixes the toner image formed on the print medium by interposing the print medium on which the toner image is formed by a fixing roller, which is heated to a high temperature by a heater.

The image forming apparatus 2 and the information processing apparatus 3 transmit and receive data by wireless communication. Examples of a wireless communication method include, for example, Wi-Fi Direct (registered trademark) and Bluetooth Low Energy (registered trademark). That is, the image forming apparatus 2 and the information processing apparatus 3 perform wireless communication with each other by either Wi-Fi Direct (first communication method) or Bluetooth Low Energy (second communication method). Hereinafter, Bluetooth Low Energy is simply referred to as Bluetooth (registered trademark).

In Wi-Fi Direct, there is an upper limit on the number of apparatuses that can be simultaneously connected to an AP (the number of connectable apparatuses). The number of apparatuses connectable to the image forming apparatus 2 functioning as an AP depends on hardware of the image forming apparatus 2. The present embodiment will be described based on an assumption that the number of connectable apparatuses is eight when the image forming apparatus 2 functions as an AP of Wi-Fi Direct.

The information processing apparatus 3 establishes Wi-Fi Direct communication with the image forming apparatus 2 by transmitting a connection request to the image forming apparatus 2 functioning as an AP. On the other hand, in a state where the number of connected apparatuses reaches eight, which is the number of connectable apparatuses, when receiving a Wi-Fi Direct connection request, the image forming apparatus 2 cannot notify a fact that connection is not allowed, by Wi-Fi Direct. That is, although the information processing apparatus 3 transmits a Wi-Fi Direct connection request to the image forming apparatus 2, the information processing apparatus 3 cannot receive a response representing that connection is not allowed from the image forming apparatus 2. For this reason, the information processing apparatus 3 cannot recognize a reason of a connection error.

Therefore, in a state where the number of connected apparatuses reaches the number of connectable apparatuses, when receiving a Wi-Fi Direct connection request, the image forming apparatus 2 notifies a fact that connection is not allowed, by another communication method other than Wi-Fi Direct.

First, the image forming apparatus 2 will be described.

As illustrated in FIG. 1 and FIG. 2, the image forming apparatus 2 includes a housing 11, an image reading unit 12, a paper feed cassette 13, a paper discharge tray 14, a transport unit 15, an image forming unit 16, a display 17, an operation interface 18, a card reader 19, a first communication interface 20, a second communication interface 21, and a system controller 22. The housing 11 is a main body that holds components of the image forming apparatus 2.

The image reading unit 12 is configured to read an image from an original document. The image reading unit 12 includes, for example, a scanner and an automatic document feeder (ADF).

The scanner includes an image sensor, a lamp, an optical element, and the like. The image sensor is an imaging element in which pixels converting light into an electrical signal (image signal) are arranged in a line shape. The image sensor is configured by, for example, a charge coupled device (CCD), a complementary metal oxide semiconductor (CMOS), or another imaging element. The lamp irradiates an original document with light. The optical element images light from a predetermined reading area, on the pixels of the image sensor. In the reading area of the optical element, the original document is irradiated with light from the lamp, the light is reflected from the original document, and the reflected light is imaged on the pixels of the image sensor. With this configuration, the scanner reads an image from an original document.

The ADF is a mechanism for transporting an original document. The ADF acquires the original document and transports the original document to the predetermined reading area.

The image reading unit 12 acquires an entire image of the original document by causing the image sensor to continuously acquire an image line by line while causing the ADF to transport the original document. In addition, the image reading unit 12 may acquire an entire image of the original document by causing the image sensor to continuously acquire an image line by line from the stationary original document while moving the scanner.

The paper feed cassette 13 is a cassette which accommodates a print medium. The paper feed cassette 13 is configured to be able to supply a print medium from the outside of the housing 11. For example, the paper feed cassette 13 is configured to be able to be drawn from the housing 11.

The paper discharge tray 14 is a tray that supports the print medium discharged from the image forming apparatus 2.

The transport unit 15 transports the print medium. The transport unit 15 is configured with a plurality of guides and a plurality of rollers, and includes a transport path through which the print medium is transported. For example, the transport rollers are rotated under a control of the system controller 22, and thus the print medium is transported along the transport path.

The transport unit 15 includes, for example, a loading roller, a paper feed transport path, a paper discharge transport path, and a reverse transport path. The loading roller loads the print medium accommodated in the paper feed cassette into the paper feed transport path. On the paper feed transport path, the print medium which is loaded from the paper feed cassette by the loading roller is transported to the image forming unit. On the paper discharge transport path, the print medium on which an image is formed by the image forming unit is discharged from the housing 11. The discharged print medium is stacked on the paper discharge tray 14.

The reverse transport path is a transport path for supplying the print medium to the image forming unit 16 again by reversing front and back surfaces of the print medium on which an image is formed by the image forming unit 16.

The image forming unit 16 forms an image on the print medium under a control of the system controller 22. The image forming unit 16 includes a processing unit, a transfer belt, a transfer roller, and a fixing roller. For example, the image forming unit 16 includes processing units for different colors such as cyan, magenta, yellow, and black.

A toner cartridge filled with toner is loaded into each processing unit. The toner cartridge is a container filled with toner. The processing unit receives the toner from the toner cartridge, and forms an image of the toner (toner image) on the transfer belt for forming an image on the print medium. Specifically, the processing unit charges the drum, and forms an electrostatic latent image corresponding to the print data on the charged drum. The processing unit adheres the toner to the latent image formed on the drum, and transfers the toner adhered to the electrostatic latent image onto the transfer belt.

The transfer belt is a member for receiving the toner image formed on a front surface of the drum and transferring the toner image onto the print medium. The transfer belt is moved by rotation of a roller. The transfer belt receives toner image formed on the drum at a position at which the transfer belt comes into contact with the drum, and transfers the received toner image to the transfer roller.

The transfer roller is configured to interpose the transfer belt and the print medium. The transfer roller transfers the toner image on the transfer belt to the print medium.

The fixing roller is configured to interpose the print medium. The fixing roller is heated by a heater (not illustrated). The fixing roller fixes the toner image formed on the print medium by pressuring the interposed print medium in a heated state. That is, the fixing roller forms an image on the print medium by fixing the toner image.

The display 17 displays a screen corresponding to a video signal which is input from the system controller 22 or a display control unit such as a graphic controller (not illustrated). For example, a screen for various settings of the image forming apparatus 2 is displayed on the display 17.

The operation interface 18 includes various operation members. The operation interface 18 supplies an operation signal corresponding to an operation of the operation members to the system controller 22. The operation members include, for example, a touch sensor, a ten key, a power key, a paper feed key, various function keys, a keyboard, or the like. The touch sensor is, for example, a resistance film type touch sensor, a capacitance type touch sensor, or the like. The touch sensor acquires information representing a designated position within a certain region. The touch sensor is configured with a touch panel integrally with the display 17, and thus a signal representing a touched position on a screen displayed on the display 17 is input to the system controller 22.

The card reader 19 is an interface for performing communication with an IC card possessed by a user of the image forming apparatus 2. The card reader 19 transmits and receives data to and from the IC card by contact communication or non-contact communication.

The IC card includes an IC chip and a communication circuit. The IC chip includes a CPU, a ROM, a RAM, a nonvolatile memory, and the like. The nonvolatile memory of the IC chip stores identification information representing the user who possesses the IC card. The communication circuit is configured with, for example, an antenna or a contact terminal (contact pattern). The communication circuit is electrically or magnetically connected to the card reader 19.

By performing communication with the IC card, the card reader 19 acquires the identification information representing the user who possesses the IC card, from the IC card.

The first communication interface 20 is an interface for performing wireless communication with the information processing apparatus 3. The first communication interface 20 performs wireless communication with the information processing apparatus 3 by Wi-Fi Direct (first communication method).

The second communication interface 21 is an interface for performing wireless communication with the information processing apparatus 3. The second communication interface 21 performs wireless communication with the information processing apparatus 3 by Bluetooth (second communication method). The system controller 22 controls the image forming apparatus 2. The system controller 22 includes, for example, a CPU 31, a ROM 32, a RAM 33, and a nonvolatile memory 34.

The CPU 31 is a computation element (for example, a processor) that executes computation processing. The CPU 31 performs various processing based on data such as a program stored in the ROM 32. By executing the program stored in the ROM 32, the CPU 31 functions as a control unit capable of executing various operations.

The ROM 32 is a nonvolatile read-only memory. The ROM 32 stores programs and data to be used in programs.

The RAM 33 is a volatile memory functioning as a working memory. The RAM 33 temporarily stores data or the like during processing of the CPU 31. In addition, the RAM 33 temporarily stores programs to be executed by the CPU 31.

The nonvolatile memory 34 is a storage medium which can store various types of information. The nonvolatile memory 34 stores programs and data to be used in programs. The nonvolatile memory 34 is, for example, a solid state drive (SSD), a hard disk drive (HDD), or another memory device. Instead of the nonvolatile memory 34, a memory interface such as a card slot into which a storage medium such as a memory card can be inserted may be provided.

In addition, the system controller 22 is connected to the image reading unit 12, the transport unit 15, the image forming unit 16, the display 17, the card reader 19, the operation interface 18, the first communication interface 20, the second communication interface 21, and the like, via a bus.

Next, the information processing apparatus 3 will be described.

As illustrated in FIG. 1 and FIG. 3, the information processing apparatus 3 includes a display 41, an operation interface 42, a first communication interface 43, a second communication interface 44, and a system controller 45.

The display 41 displays a screen corresponding to a video signal which is input from the system controller 45 or a display control unit such as a graphic controller (not illustrated).

The operation interface 42 includes various operation members. The operation interface 42 supplies an operation signal corresponding to an operation of the operation members to the system controller 45. The operation members include, for example, a touch sensor, a ten key, a power key, a paper feed key, various function keys, a keyboard, or the like. The touch sensor is, for example, a resistance film type touch sensor, a capacitance type touch sensor, or the like. The touch sensor acquires information representing a designated position within a certain region. The touch sensor is configured with a touch panel integrally with the display 41, and thus a signal representing a touched position on a screen displayed on the display 41 is input to the system controller 45.

The first communication interface 43 is an interface for performing wireless communication with the image forming apparatus 2. The first communication interface 43 performs wireless communication with the image forming apparatus 2 by Wi-Fi Direct (first communication method).

The second communication interface 44 is an interface for performing wireless communication with the image forming apparatus 2. The second communication interface 44 performs wireless communication with the image forming apparatus 2 by Bluetooth (second communication method).

The system controller 45 controls the information processing apparatus 3. The system controller 45 includes, for example, a CPU 51, a ROM 52, a RAM 53, and a nonvolatile memory 54.

The CPU 51 is a computation element (for example, a processor) that executes computation processing. The CPU 51 performs various processing based on data such as a program stored in the ROM 52. By executing the program stored in the ROM 52, the CPU 51 functions as a control unit capable of executing various operations.

The ROM 52 is a nonvolatile read-only memory. The ROM 52 stores programs and data to be used in programs.

The RAM 53 is a volatile memory functioning as a working memory. The RAM 53 temporarily stores data or the like during processing of the CPU 51. In addition, the RAM 53 temporarily stores programs to be executed by the CPU 51.

The nonvolatile memory 54 is a storage medium which can store various types of information. The nonvolatile memory 54 stores programs and data to be used in programs. The nonvolatile memory 54 is, for example, a solid state drive (SSD), a hard disk drive (HDD), or another memory device. Instead of the nonvolatile memory 54, a memory interface such as a card slot into which a storage medium such as a memory card can be inserted may be provided.

A printer driver for generating print data is stored in the nonvolatile memory 54 of the information processing apparatus 3 such that the image forming apparatus 2 performs printing based on the print data, the print data being generated based on contents such as an image, document data, or an html file that is to be printed.

The system controller 45 generates the print data by the printer driver, and transmits the print data to the image forming apparatus 2 by the first communication method or the second communication method. That is, the system controller 45 transmits the print data to the image forming apparatus 2 by the first communication interface 43 or the second communication interface 44.

First Embodiment

Next, communication between the image forming apparatus 2 and the information processing apparatus 3 according to a first embodiment will be described.

As described above, the image forming apparatus 2 and the information processing apparatus 3 perform wireless communication with each other by either Wi-Fi Direct (first communication method) or Bluetooth (second communication method).

The image forming apparatus 2 and the information processing apparatus 3 can perform wireless communication by acquiring information for starting wireless communication from each other. The information for starting wireless communication is, for example, identification information of a communication partner.

In Wi-Fi Direct, the identification information is a MAC address, an apparatus name, an SSID, or the like. In Wi-Fi Direct, the image forming apparatus 2 functions as an access point (AP). In Wi-Fi Direct, the information processing apparatus 3 acquires an SSID of the image forming apparatus 2 as an AP, and the image forming apparatus 2 acquires a MAC address or an apparatus name of the information processing apparatus 3 as a communication partner. Thereby, wireless communication can be performed.

In Bluetooth, the identification information is, for example, a Bluetooth ID. In Bluetooth, each of the image forming apparatus 2 and the information processing apparatus 3 acquires a Bluetooth address of the communication partner, and thus wireless communication can be performed.

As described above, since the image forming apparatus 2 functions as an AP, the information processing apparatus 3 within a communication range of the image forming apparatus 2 can acquire an SSID of the image forming apparatus 2. The information processing apparatus 3 transmits a connection request including a MAC address or an apparatus name of the own apparatus, to the image forming apparatus 2. When the image forming apparatus 2 functions as an AP, the number of connectable apparatuses is set in the image forming apparatus. When the image forming apparatus 2 receives a connection request and the number of apparatuses which are already connected to the image forming apparatus does not reach the number of connectable apparatuses, the image forming apparatus 2 establishes Wi-Fi Direct communication with the information processing apparatus 3 from which the connection request is transmitted.

In addition, the information processing apparatus 3 transmits a connection request including a Bluetooth ID of the own apparatus, to the image forming apparatus 2. When the image forming apparatus 2 receives the Bluetooth connection request, the image forming apparatus 2 registers the Bluetooth ID included in the connection request, and transmits a Bluetooth ID of the own apparatus to the information processing apparatus 3. Thereby, Bluetooth communication is established between the image forming apparatus 2 and the information processing apparatus 3.

In addition, the information processing apparatus 3 can supply the Bluetooth ID to the image forming apparatus 2 by adding the Bluetooth ID to the Wi-Fi Direct connection request to be transmitted to the image forming apparatus 2. Thereby, the image forming apparatus 2 is ready to start Bluetooth wireless communication with the information processing apparatus 3.

In a state where the information processing apparatus 3 establishes Wi-Fi Direct communication or Bluetooth communication with the image forming apparatus 2, the information processing apparatus 3 transmits print data to the image forming apparatus 2.

Wi-Fi Direct communication has a higher communication speed and a wider communication range than Bluetooth communication. Therefore, when the information processing apparatus 3 transmits print data to the image forming apparatus 2 by wireless communication, the information processing apparatus 3 performs wireless communication by Wi-Fi Direct with priority higher than that of Bluetooth. On the other hand, since Wi-Fi Direct has an upper limit on the number of apparatuses that can be simultaneously connected to the image forming apparatus 2, as illustrated in FIG. 4 and FIG. 5 to be described, the image forming apparatus 2 and the information processing apparatus 3 perform wireless communication setting.

Figure 4:
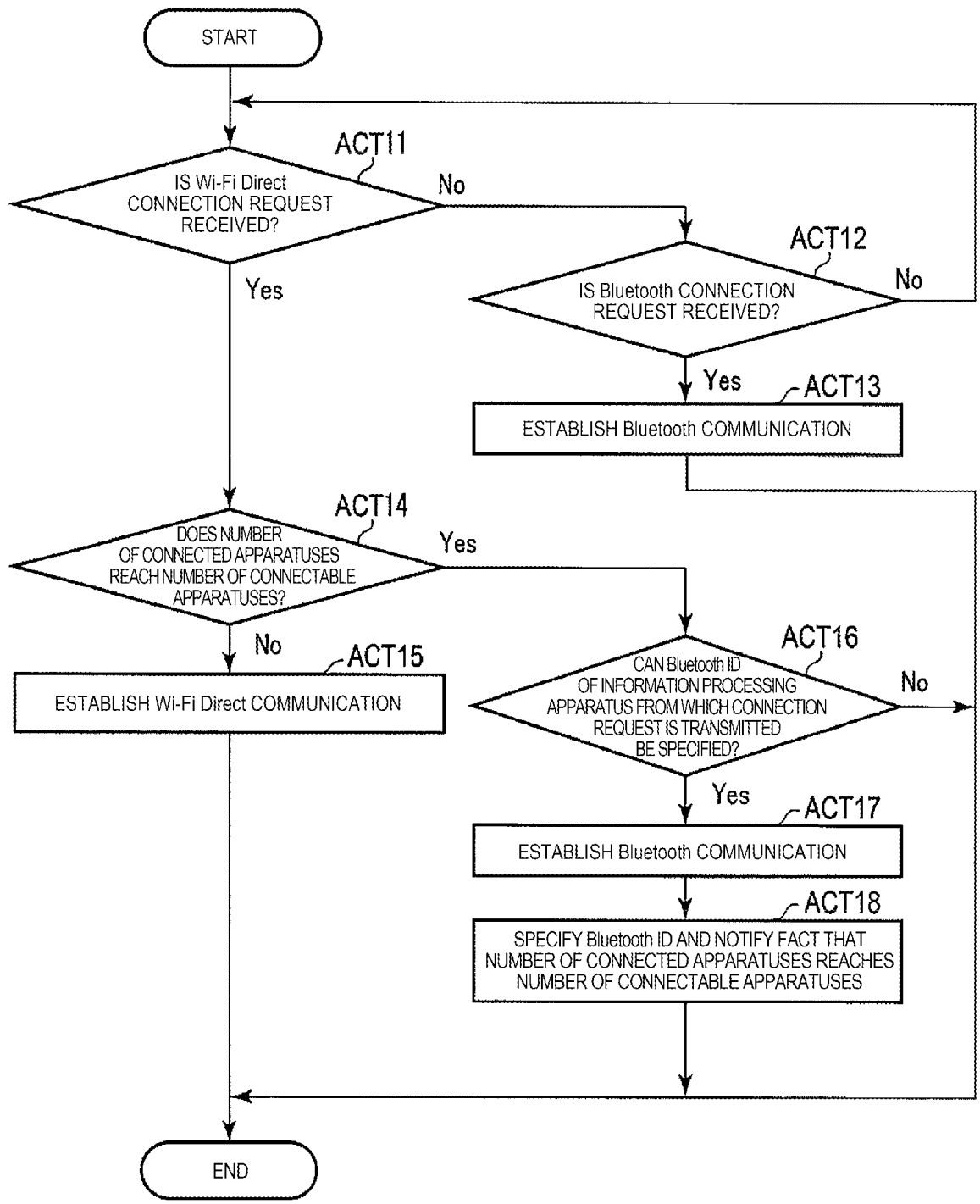
FIG. 4 is an explanatory diagram showing an example of an operation of the image forming apparatus according to a first embodiment.
Figure 5:
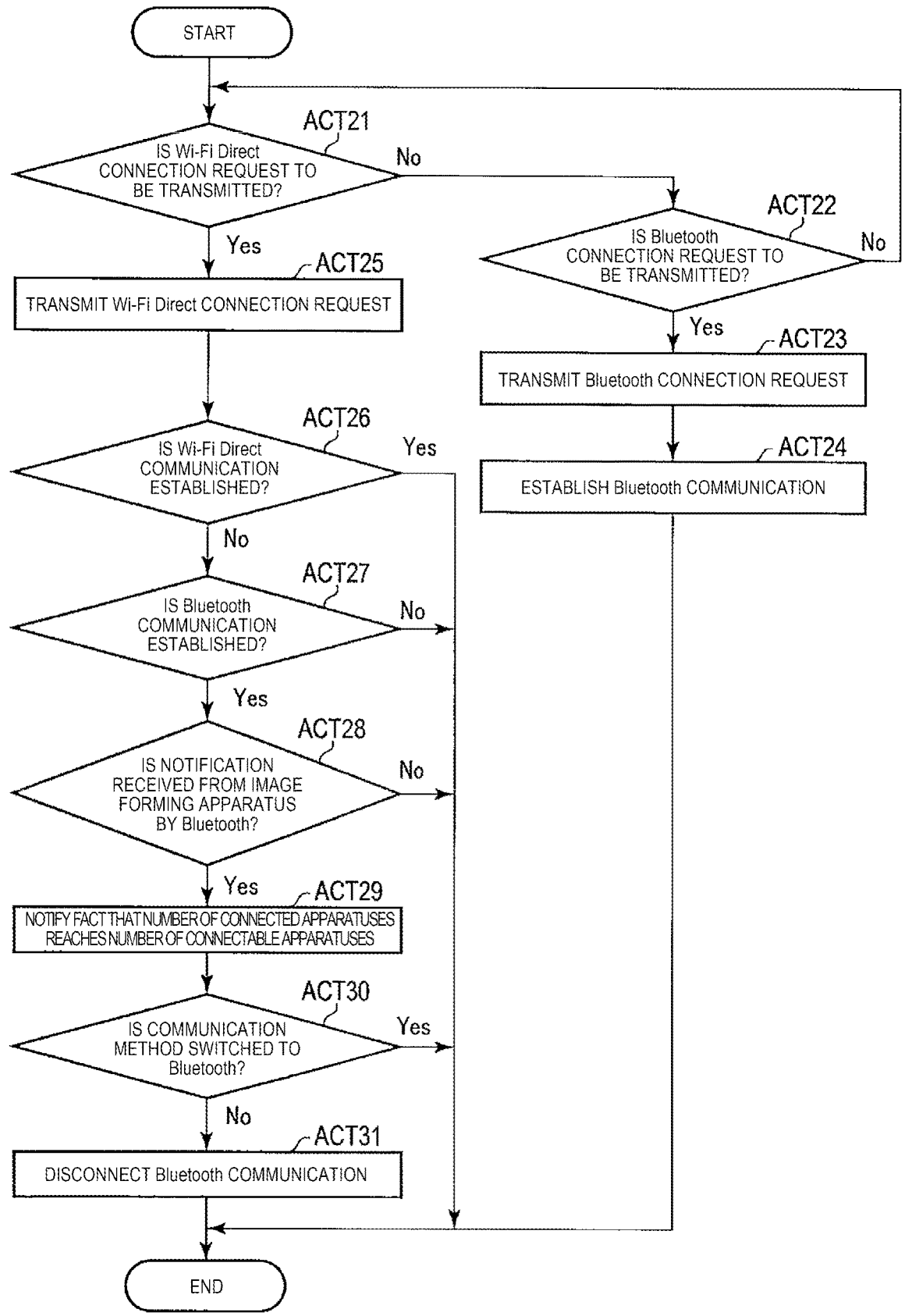
FIG. 5 is an explanatory diagram showing an example of an operation of the information processing apparatus according to the first embodiment.

FIG. 4 is an explanatory diagram showing an example of processing relating to wireless communication setting in the image forming apparatus 2. FIG. 5 is an explanatory diagram showing an example of processing relating to wireless communication setting in the information processing apparatus 3.

First, wireless communication setting in the image forming apparatus 2 will be described. As illustrated in FIG. 4, the system controller 22 of the image forming apparatus 2 first determines whether or not a Wi-Fi Direct connection request is received by the first communication interface 20 (ACT 11).

When it is determined that a Wi-Fi Direct connection request is not received (NO in ACT 11), the system controller 22 determines whether or not a Bluetooth connection request is received by the second communication interface 21 (ACT 12). When it is determined that a Bluetooth connection request is received (YES in ACT 12), the system controller 22 establishes communication by the second communication interface 21 with the information processing apparatus 3 from which the Bluetooth connection request is transmitted, (ACT 13), and ends processing.

In addition, when it is determined that a Wi-Fi Direct connection request is received (YES in ACT 11), the system controller 22 determines whether or not the number of apparatuses each in which Wi-Fi Direct communication is established reaches the predetermined number of connectable apparatuses (ACT 14).

When it is determined that the number of apparatuses each in which Wi-Fi Direct communication is established does not reach the predetermined number of connectable apparatuses (NO in ACT 14), the system controller 22 establishes communication with the information processing apparatus 3 from which the Wi-Fi Direct connection request is transmitted (ACT 15), and ends processing.

When it is determined that the number of apparatuses each in which Wi-Fi Direct communication is established reaches the predetermined number of connectable apparatuses (YES in ACT 14), the system controller 22 determines whether or not a Bluetooth ID of the information processing apparatus 3 from which the connection request is transmitted can be specified (ACT 16). For example, the system controller 22 determines whether or not a Bluetooth ID included in the Wi-Fi Direct connection request is a Bluetooth ID of the information processing apparatus 3 from which the connection request is transmitted. When it is determined that a Bluetooth ID of the information processing apparatus 3 from which the connection request is transmitted cannot be specified (NO in ACT 16), the system controller 22 ends processing.

When a Bluetooth ID of the information processing apparatus 3 from which the connection request is transmitted can be specified (YES in ACT 16), the system controller 22 establishes communication with the information processing apparatus 3 having the specified Bluetooth ID, by the second communication interface 21, that is, Bluetooth (ACT 17). That is, the system controller 22 establishes Bluetooth communication with the information processing apparatus 3 corresponding to the Bluetooth ID by transmitting a connection request including the specified Bluetooth ID.

Further, the system controller 22 notifies the information processing apparatus 3 having the specified Bluetooth ID of a fact that the number of apparatuses which are connected by Wi-Fi Direct reaches the number of connectable apparatuses, by Bluetooth (ACT 18), and ends processing.

Next, wireless communication setting in the information processing apparatus 3 will be described. As described above, when the information processing apparatus 3 transmits print data to the image forming apparatus 2, the information processing apparatus 3 first establishes communication with the image forming apparatus 2.

As illustrated in FIG. 5, the system controller 45 of the information processing apparatus 3 first determines whether to transmit a Wi-Fi Direct connection request by the first communication interface 43 (ACT 21). The system controller 45 recognizes an AP within a communication range by acquiring an SSID output from the AP. For example, when an image forming apparatus 2 functioning as an AP exists within a communication range, the system controller 45 determines to transmit a Wi-Fi Direct connection request to the image forming apparatus 2 having the acquired SSID.

When the system controller 45 determines not to transmit a Wi-Fi Direct connection request (NO in ACT 21), the system controller 45 determines whether to transmit a Bluetooth connection request by the second communication interface 44 (ACT 22). The system controller 45 recognizes a Bluetooth apparatus within a communication range by acquiring a Bluetooth ID output from the apparatus. For example, when a Bluetooth image forming apparatus 2 exists within a communication range, the system controller 45 determines to transmit a Bluetooth connection request to the image forming apparatus 2.

When the system controller 45 determines to transmit a Bluetooth connection request in ACT 22 (YES in ACT 22), the system controller 45 transmits a connection request including a Bluetooth ID of the own apparatus, to the image forming apparatus 2 (ACT 23). Thereby, the system controller 45 establishes Bluetooth communication with the image forming apparatus 2 (ACT 24), and ends processing. When communication is established between the image forming apparatus 2 and the information processing apparatus 3, the system controller 45 can transmit print data to the image forming apparatus 2. As described above, when Bluetooth communication is established between the image forming apparatus 2 and the information processing apparatus 3, at a timing after ACT 24, the system controller 45 can transmit print data to the image forming apparatus 2 by Bluetooth.

In addition, when the system controller 45 determines to transmit a Wi-Fi Direct connection request in ACT 21 (YES in ACT 21), the system controller 45 transmits a Wi-Fi Direct connection request including an SSID of the image forming apparatus 2 functioning as an AP, which is a destination (ACT 25). In this case, the system controller 45 adds a MAC address or an apparatus name of the own apparatus and a Bluetooth ID of the own apparatus, to the Wi-Fi Direct connection request.

After transmitting the Wi-Fi Direct connection request, the system controller 45 waits for communication establishment for a predetermined time. The system controller 45 transmits the Wi-Fi Direct connection request, and after an elapse of a predetermined time, determines whether or not Wi-Fi Direct communication is established (ACT 26).

When it is determined that Wi-Fi Direct communication is established between the image forming apparatus 2 and the information processing apparatus 3 (YES in ACT 26), the system controller 45 ends processing. In this manner, at a timing after Wi-Fi Direct communication is established between the image forming apparatus 2 and the information processing apparatus 3, the system controller 45 can transmit print data to the image forming apparatus 2 by Wi-Fi Direct.

When it is determined that Wi-Fi Direct communication is not established between the image forming apparatus 2 and the information processing apparatus 3 (NO in ACT 26), the system controller 45 determines whether or not Bluetooth communication is established between the image forming apparatus 2 and the information processing apparatus 3 (ACT 27). That is, the system controller 45 determines whether or not Wi-Fi Direct communication is rejected by the image forming apparatus 2 and Bluetooth communication instead of Wi-Fi Direct communication is established between the image forming apparatus 2 and the information processing apparatus 3.

When it is determined that Bluetooth communication is not established between the image forming apparatus 2 and the information processing apparatus 3 (NO in ACT 27), the system controller 45 ends processing. In this case, communication is not established between the image forming apparatus 2 and the information processing apparatus 3, and a connection error occurs.

When it is determined that Bluetooth communication is established between the image forming apparatus 2 and the information processing apparatus 3 (YES in ACT 27), the system controller 45 determines whether or not a notification is received from the image forming apparatus 2 by Bluetooth (ACT 28). As described above, when it is determined that the number of apparatuses which are connected by Wi-Fi Direct reaches the predetermined number of connectable apparatuses, the image forming apparatus 2 establishes Bluetooth communication with the information processing apparatus 3 from which the Wi-Fi Direct connection request is transmitted.

Further, the image forming apparatus 2 notifies the information processing apparatus 3, from which the Wi-Fi Direct connection request is transmitted, of a fact that the number of apparatuses which are connected by Wi-Fi Direct reaches the number of connectable apparatuses. The system controller 45 determines whether or not a notification is received from the image forming apparatus 2 by Bluetooth, the notification representing that the number of apparatuses which are connected by Wi-Fi Direct reaches the number of connectable apparatuses.

When it is determined that the notification is not received (NO in ACT 28), the system controller 45 ends processing. In this case, communication is not established between the image forming apparatus 2 and the information processing apparatus 3, and a connection error occurs.

When it is determined that the notification is received (YES in ACT 28), the notification representing that the number of apparatuses which are connected by Wi-Fi Direct reaches the number of connectable apparatuses, the system controller 45 notifies a user who possesses the information processing apparatus 3 of a fact that the number of apparatuses which are connected by Wi-Fi Direct reaches the number of connectable apparatuses (ACT 29), in the information processing apparatus 3 from which the connection request is transmitted. For example, the system controller 45 causes the display 41 to display a screen representing that the number of apparatuses which are connected by Wi-Fi Direct reaches the number of connectable apparatuses.

The system controller 45 determines whether to switch the communication method for transmitting print data to Bluetooth (ACT 30). For example, when Bluetooth is ON, the system controller 45 determines to automatically switch the communication method for transmitting print data to Bluetooth. In addition, the system controller 45 may cause the display 41 to display a screen that allows the user to select whether to switch the communication method for transmitting print data to Bluetooth. In this case, based on an operation by the operation interface 42, the system controller 45 determines whether to switch the communication method for transmitting print data to Bluetooth.

When it is determined that the communication method for transmitting print data is not switched to Bluetooth (NO in ACT 30), the system controller 45 disconnects Bluetooth communication with the image forming apparatus 2 (ACT 31), and ends processing.

When it is determined that the communication method for transmitting print data is switched to Bluetooth (YES in ACT 30), the system controller 45 maintains Bluetooth communication with the image forming apparatus 2, and ends processing of FIG. 5. In this case, the system controller 45 can transmit print data to the image forming apparatus 2 by Bluetooth.

As described above, in a state where the number of apparatuses which are connected by the first communication method reaches the number of connectable apparatuses, when a connection request by the first communication method is received from the information processing apparatus 3, the system controller 22 of the image forming apparatus 2 according to the first embodiment notifies the information processing apparatus 3 of a fact that the number of connected apparatuses reaches the number of connectable apparatuses, by the second communication method. Thereby, the system controller 45 of the information processing apparatus 3 can recognize a fact that connection by the first communication method is rejected by the image forming apparatus 2 and a reason of the connection rejection.

In addition, the system controller 45 adds information required for starting communication by the second communication method, to the connection request by the first communication method. When the number of apparatuses which are connected by the first communication method reaches the number of connectable apparatuses, the system controller 22 acquires the information required for starting communication by the second communication method, from the connection request by the first communication method.

Based on the information acquired from the connection request, the system controller 22 establishes communication by the second communication method with the information processing apparatus 3, and notifies the information processing apparatus 3 of a fact that the number of apparatuses which are connected by the first communication method reaches the number of connectable apparatuses. Thereby, the system controller 45 of the information processing apparatus 3 can recognize a fact that connection by the first communication method is rejected by the image forming apparatus 2 and a reason of the connection rejection.

In addition, when the number of apparatuses which are connected by the first communication method reaches the number of connectable apparatuses, the system controller 22 receives print data from the information processing apparatus 3 by the second communication method. Thereby, even when the number of apparatuses which are connected by the first communication method reaches the number of connectable apparatuses, the image forming apparatus 2 can receive print data from the information processing apparatus 3.

In the first embodiment described above, although the system controller 45 of the information processing apparatus 3 adds information required for starting Bluetooth communication to the Wi-Fi Direct connection request, the present embodiment is not limited to the configuration. The system controller 45 of the information processing apparatus 3 may be configured to transmit a connection request for Bluetooth communication to the image forming apparatus 2 at any timing. In this case, every time the information processing apparatus 3 is connected to the image forming apparatus 2 by Wi-Fi Direct, the system controller 22 of the image forming apparatus 2 stores a Bluetooth ID and Wi-Fi Direct identification information (a MAC address or an apparatus name) of the connected apparatus in the memory in association with each other.

The system controller 22 may transmit a connection request to the information processing apparatus 3 having a Bluetooth ID, which is not associated with Wi-Fi Direct identification information, establish communication, and transmit a notification representing that the number of apparatuses which are connected by Wi-Fi Direct reaches the number of connectable apparatuses.

Second Embodiment

Next, communication between the image forming apparatus 2 and the information processing apparatus 3 according to a second embodiment will be described. In the second embodiment, although processing relating to communication in the image forming apparatus 2 and the information processing apparatus 3 is different from the processing of the first embodiment, the configuration is the same as in the first embodiment, and thus a description of the configuration will be omitted.

Similar to the first embodiment, the image forming apparatus 2 and the information processing apparatus 3 according to the second embodiment perform wireless communication with each other by either Wi-Fi Direct (first communication method) or Bluetooth (second communication method).

The image forming apparatus 2 and the information processing apparatus 3 can perform Wi-Fi Direct wireless communication by acquiring information for starting Wi-Fi Direct wireless communication from each other. The information for starting Wi-Fi Direct wireless communication is, for example, identification information of a communication partner.

In Wi-Fi Direct, the identification information is a MAC address, an apparatus name, an SSID, or the like. In Wi-Fi Direct, the image forming apparatus 2 functions as an access point (AP). In Wi-Fi Direct, the information processing apparatus 3 acquires an SSID of the image forming apparatus 2 as an AP, and the image forming apparatus 2 acquires a MAC address or an apparatus name of the information processing apparatus 3 as a communication partner. Thereby, wireless communication can be performed.

Since the image forming apparatus 2 functions as an AP, the information processing apparatus 3 within a communication range of the image forming apparatus 2 can acquire an SSID of the image forming apparatus 2. The information processing apparatus 3 transmits a connection request including a MAC address or an apparatus name of the own apparatus, to the image forming apparatus 2.

When the image forming apparatus 2 functions as an AP, the number of connectable apparatuses is set in the image forming apparatus. When the image forming apparatus 2 receives a connection request and the number of apparatuses which are already connected to the image forming apparatus does not reach the number of connectable apparatuses, the image forming apparatus 2 establishes Wi-Fi Direct communication with the information processing apparatus 3 from which the connection request is transmitted.

In a state where the information processing apparatus 3 establishes Wi-Fi Direct communication or Bluetooth communication with the image forming apparatus 2, the information processing apparatus 3 transmits print data to the image forming apparatus 2.

In addition, in Bluetooth Low Energy which is the second communication method, broadcast (or multicast) for 1:n communication can be performed. In other words, the image forming apparatus 2 can transmit information to the information processing apparatus 3 which exists within a communication range, without acquiring a Bluetooth ID of the information processing apparatus 3. That is, the image forming apparatus 2 functions as a broadcaster, and the information processing apparatus 3 functions as an observer. With such a configuration, the image forming apparatus 2 can supply any information to the information processing apparatus 3 functioning as an observer within a communication range at any timing.

Figure 6:
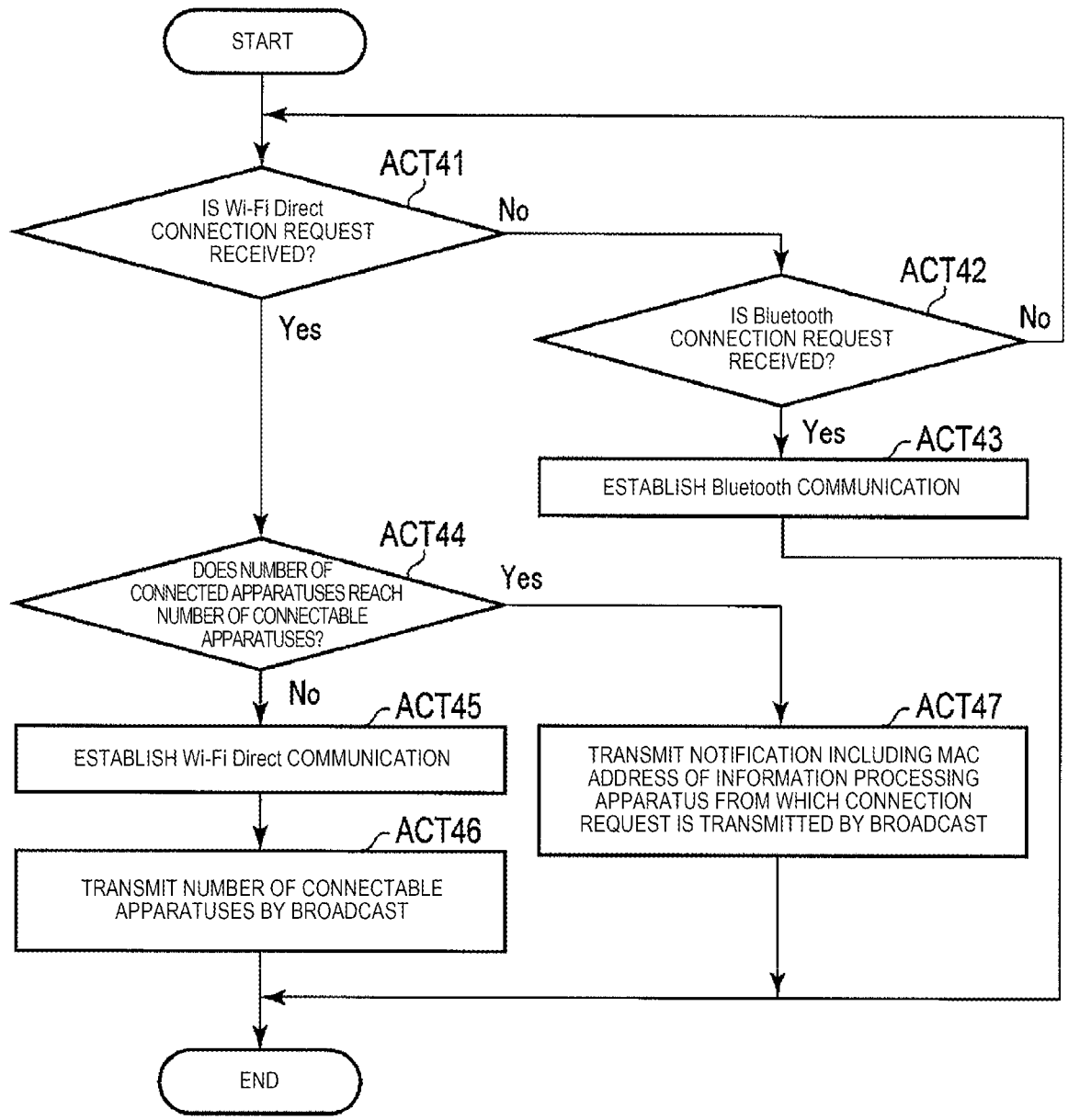
FIG. 6 is an explanatory diagram showing an example of an operation of the image forming apparatus according to a second embodiment.
Figure 7:
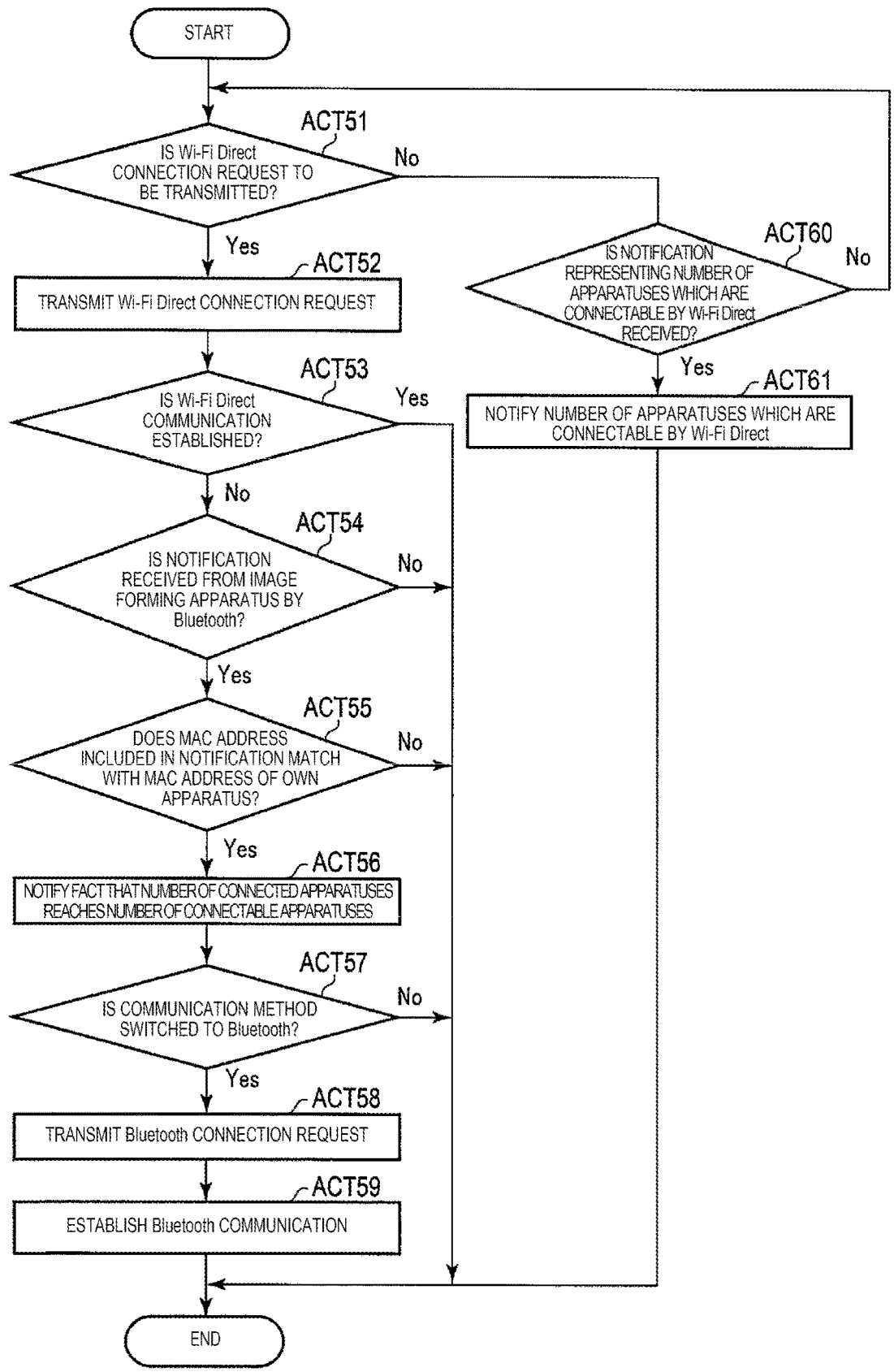
FIG. 7 is an explanatory diagram showing an example of an operation of the information processing apparatus according to the second embodiment.

FIG. 6 is an explanatory diagram showing an example of processing relating to wireless communication setting in the image forming apparatus 2. FIG. 7 is an explanatory diagram showing an example of processing relating to wireless communication setting in the information processing apparatus 3.

First, wireless communication setting in the image forming apparatus 2 will be described.

As illustrated in FIG. 6, the system controller 22 of the image forming apparatus 2 first determines whether or not a Wi-Fi Direct connection request is received by the first communication interface 20 (ACT 41).

When it is determined that a Wi-Fi Direct connection request is not received (NO in ACT 41), the system controller 22 determines whether or not a Bluetooth connection request is received by the second communication interface 21 (ACT 42).

When it is determined that a Bluetooth connection request is received (YES in ACT 42), the system controller 22 establishes communication by the second communication interface 21 with the information processing apparatus 3 from which the Bluetooth connection request is transmitted (ACT 43), and ends processing.

In addition, when it is determined that a Wi-Fi Direct connection request is received (YES in ACT 41), the system controller 22 determines whether or not the number of apparatuses each in which Wi-Fi Direct communication is established reaches the predetermined number of connectable apparatuses (ACT 44).

When it is determined that the number of apparatuses each in which Wi-Fi Direct communication is established does not reach the predetermined number of connectable apparatuses (NO in ACT 44), the system controller 22 establishes communication with the information processing apparatus 3 from which the Wi-Fi Direct connection request is transmitted (ACT 45). Further, the system controller 22 transmits the number of connectable apparatuses by broadcast (ACT 46), and ends processing. That is, the system controller 22 transmits information representing that Wi-Fi Direct connection is still allowed, to the information processing apparatus 3 which exists within a communication range and functions as an observer.

For example, each time the number of apparatuses which are connected by Wi-Fi Direct changes, the system controller 22 transmits a notification representing the number of connectable apparatuses, by broadcast. In addition, the system controller 22 may be configured to transmit a notification representing the number of connectable apparatuses (that is, a notification representing that the number of connectable apparatuses is zero) by broadcast when the number of apparatuses which are connected by Wi-Fi Direct reaches the number of connectable apparatuses.

In addition, for example, the system controller 22 may be configured to transmit a notification representing the number of connectable apparatuses by broadcast at regular time intervals. Further, the system controller 22 may be configured to transmit a notification prompting disconnection of wireless communication by broadcast at regular time intervals. Thereby, it is possible to prevent the information processing apparatus 3 from being left connected by Wi-Fi Direct.

In addition, when it is determined that the number of connected apparatuses reaches the predetermined number of connectable apparatuses (YES in ACT 44), the system controller 22 transmits a notification including a MAC address (or an apparatus name) of the information processing apparatus 3 from which the connection request is transmitted, by broadcast (ACT 47), and ends processing. That is, the system controller 22 transmits a notification including information for specifying the information processing apparatus 3, from which the connect ion request is received but which cannot be connected to the image forming apparatus 2, to each information processing apparatus 3 which exists within a communication range and functions as an observer.

Next, wireless communication setting in the information processing apparatus 3 will be described. As illustrated in FIG. 7, the system controller 45 of the information processing apparatus 3 first determines whether to transmit a Wi-Fi Direct connection request by the first communication interface 43 (ACT 51). The system controller 45 recognizes an AP within a communication range by acquiring an SSID output from the AP. For example, when an image forming apparatus 2 functioning as an AP exists within a communication range, the system controller 45 determines to transmit a Wi-Fi Direct connection request to the image forming apparatus 2 having the acquired SSID.

In addition, when the system controller 45 determines to transmit a Wi-Fi Direct connection request (YES in ACT 51), the system controller 45 transmits a Wi-Fi Direct connection request including an SSID of the image forming apparatus 2 functioning as an AP, which is a destination (ACT 52). In this case, the system controller 45 adds a MAC address (or an apparatus name) of the own apparatus to the Wi-Fi Direct connection request.

After transmitting the Wi-Fi Direct connection request, the system controller 45 waits for communication establishment for a predetermined time. The system controller 45 transmits the Wi-Fi Direct connection request, and after an elapse of a predetermined time, determines whether or not Wi-Fi Direct communication is established (ACT 53).

When it is determined that Wi-Fi Direct communication is established between the image forming apparatus 2 and the information processing apparatus 3 (YES in ACT 53), the system controller 45 ends processing. In this manner, at a timing after Wi-Fi Direct communication is established between the image forming apparatus 2 and the information processing apparatus 3, the system controller 45 can transmit print data to the image forming apparatus 2 by Wi-Fi Direct.

When it is determined that Wi-Fi Direct communication is not established between the image forming apparatus 2 and the information processing apparatus 3 (NO in ACT 53), the system controller 45 determines whether or not the notification transmitted by Bluetooth broadcast is received from the image forming apparatus 2 (ACT 54). That is, the system controller 45 determines whether or not the notification transmitted from the image forming apparatus 2 by broadcast is received, the notification representing that the number of apparatuses which are connected by Wi-Fi Direct reaches the number of connectable apparatuses.

When it is determined that the notification is not received (NO in ACT 54), the system controller 45 ends processing. In this case, communication is not established between the image forming apparatus 2 and the information processing apparatus 3, and a connection error occurs.

When it is determined that the notification is received (YES in ACT 54), the system controller 45 determines whether or not a MAC address included in the notification matches with a MAC address of the own apparatus (ACT 55). When the system controller 45 determines that the MAC address included in the notification does not match with the MAC address of the own apparatus (NO in ACT 55), the system controller 45 ends processing.

When the system controller 45 determines that the MAC address included in the notification matches with the MAC address of the own apparatus (YES in ACT 55), the system controller 45 notifies a user who possesses the information processing apparatus 3 of a fact that the number of apparatuses which are connected by Wi-Fi Direct reaches the number of connectable apparatuses (ACT 56), in the information processing apparatus 3 from which the connection request is transmitted. For example, the system controller 45 causes the display 41 to display a screen representing that the number of apparatuses which are connected by Wi-Fi Direct reaches the number of connectable apparatuses.

The system controller 45 determines whether to switch the communication method for transmitting print data to Bluetooth (ACT 57). For example, the system controller 45 determines whether to switch the communication method for transmitting print data to Bluetooth based on a predetermined setting. In addition, the system controller 45 may cause the display 41 to display a screen that allows the user to select whether to switch the communication method for transmitting print data to Bluetooth. In this case, based on an operation by the operation interface 42, the system controller 45 determines whether to switch the communication method for transmitting print data to Bluetooth.

When the system controller 45 determines not to switch the communication method for transmitting print data to Bluetooth (NO in ACT 57), the system controller 45 ends processing.

When the system controller 45 determines to switch the communication method for transmitting print data to Bluetooth (YES in ACT 57), the system controller 45 transmits a Bluetooth connection request by the second communication interface 44.

The system controller 45 recognizes a Bluetooth apparatus within a communication range by acquiring a Bluetooth ID output from the apparatus corresponding to the Bluetooth. For example, when a Bluetooth image forming apparatus 2 exists within a communication range, the system controller 45 determines to transmit a Bluetooth connection request to the image forming apparatus 2.

The system controller 45 transmits a connection request including a Bluetooth ID of the own apparatus, to the image forming apparatus 2. Thereby, the system controller 45 establishes Bluetooth communication with the image forming apparatus 2 (ACT 59), and ends processing.

When communication is established between the image forming apparatus 2 and the information processing apparatus 3, the system controller 45 can transmit print data to the image forming apparatus 2. As described above, when Bluetooth communication is established between the image forming apparatus 2 and the information processing apparatus 3, the system controller 45 can transmit print data to the image forming apparatus 2 by Bluetooth.

In addition, when the system controller 45 determines not to transmit a Wi-Fi Direct connection request in ACT 51 (NO in ACT 51), the system controller 45 determines whether or not a notification transmitted by Bluetooth broadcast is received from the image forming apparatus 2 (ACT 60), the notification representing the remaining number of apparatuses which are connectable to the image forming apparatus 2 by Wi-Fi Direct. When it is determined that the notification is received (YES in ACT 60), the notification representing the remaining number of apparatuses which are connectable to the image forming apparatus 2 by Wi-Fi Direct, the system controller 45 notifies a user who possesses the information processing apparatus 3 of the remaining number of apparatuses which are connectable to the image forming apparatus 2 by Wi-Fi Direct (ACT 61), and ends processing. For example, the system controller 45 causes the display 41 to display a screen representing the remaining number of apparatuses which are connectable to the image forming apparatus 2 by Wi-Fi Direct.

As described above, when the number of apparatuses which are connected by the first communication method reaches the number of connectable apparatuses, the system controller 22 of the image forming apparatus 2 according to the second embodiment notifies an unspecified information processing apparatus 3 within a communication range of a fact that the number of connected apparatuses reaches the number of connectable apparatuses, by the second communication method. Thereby, the image forming apparatus 2 can notify that there is no apparatus which is connectable to the image forming apparatus 2 by the first communication method, without acquiring information for starting wireless communication by the second communication method from the information processing apparatus 3. As a result, the system controller 45 of the information processing apparatus 3 can recognize a fact that connection by the first communication method is rejected by the image forming apparatus 2 and a reason of the connection rejection.

In addition, the system controller 22 transmits a notification to an unspecified information processing apparatus 3 which exists within a communication range, the notification representing the remaining number of apparatuses which are connectable to the image forming apparatus 2 by Wi-Fi Direct. When the notification is received, the system controller 45 of the information processing apparatus 3 notifies a user of the remaining number of apparatuses which are connectable to the image forming apparatus 2 by Wi-Fi Direct. Thereby, a user who possesses the information processing apparatus 3 can determine whether or not Wi-Fi Direct connection is allowed before transmitting a Wi-Fi Direct connection request to the image forming apparatus 2.

The functions described in the embodiments can be realized not only by using hardware but also by loading a program in which each function is described by software into a computer. In addition, each function may be realized by selecting software or hardware as appropriate.

While certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming system comprising:
   an image forming apparatus; and
   an information processing apparatus,
   wherein the image forming apparatus includes
      an image forming unit configured to form an image on a print medium based on print data supplied from the information processing apparatus,
      a first communication interface configured to perform wireless communication with the information processing apparatus by a first communication method in which the number of connectable apparatuses is set,
      a second communication interface configured to perform wireless communication with the information processing apparatus by a second communication method, and
      a first system controller configured to cause the second communication interface to transmit a notification to the information processing apparatus when the number of apparatuses which are connected by the first communication interface has reached the number of connectable apparatuses, the notification representing that the number of apparatuses which are connected by the first communication interface has reached the number of connectable apparatuses, and
   wherein the information processing apparatus includes
      a third communication interface configured to perform wireless communication with the image forming apparatus by the first communication method,
      a fourth communication interface configured to perform wireless communication with the image forming apparatus by the second communication method, and
      a second system controller configured to generate print data to be used in image formation by the image forming apparatus, cause the third communication interface to transmit a connection request by the first communication method to the image forming apparatus, and output that connection by the first communication method is not allowed when a notification representing that connection by the first communication method is not allowed is received by the fourth communication interface.

2. The image forming system of claim 1, wherein the first communication interface is configured to perform wireless communication by having the image forming apparatus function as an access point for direct network connection with the information processing apparatus.

3. The image forming system of claim 2, wherein the second communication interface is configured to perform wireless communication by Bluetooth.

4. The image forming system of claim 1, wherein the image forming apparatus further comprises an image reading unit, a transport unit, an image forming unit, a display, an operation interface, and a card reader.

5. The image forming system of claim 4, wherein the first system controller is further configured to receive and store data acquired through the image reading unit and communicate the acquired data to the information processing apparatus.

6. The image forming system of claim 4, wherein the first system controller is further configured to receive and store data sent from the information processing apparatus and control the image forming unit to form images based on the data sent from the information processing apparatus.

7. The image forming system of claim 1, wherein the first system controller includes a processor configured to determine a number of apparatus connected by the first communication interface to the image forming apparatus.

8. A method for establishing connection with an information processing apparatus, the method comprising:
   determining whether a connection request of a first type of wireless communication has been received;
   upon a determination that the connection request of the first type of wireless communication has been received, determining whether a number of existing connections of the first type of wireless communication has reached a limit;
   upon a determination that the number of existing connections of the first type of wireless communication has reached the limit, determining whether an identification has been specified, wherein the identification is associated with the connection request of the first type of wireless communication and is for use with a second type of wireless communication; and
   upon a determination that the identification has been specified, establishing a wireless connection using the identification through the second type of wireless communication.

9. The method of claim 8, further comprising:
   upon a determination that the connection request of the first type of wireless communication has not been received, determining whether a second connection request of the second type of wireless communication has been received;

upon a determination that the second connection request of the second type of wireless communication has been received, establishing a wireless connection in response to the second connection request through the second type of wireless communication; and upon a determination that the second connection request of the second type of wireless communication has not been received, returning to seek for the connection request of the first type of wireless communication.

10. The method of claim 8, further comprising transmitting, upon a determination that the number of existing connections of the first type of wireless communication has reached the limit, a notification including a MAC address associated with the connection request by broadcast.

11. The method of claim 10, further comprising transmitting, upon a determination that the number of existing connections of the first type of wireless communication has not reached the limit, a number of connectable apparatus using the first type of wireless communication by broadcast.

12. The method of claim 11, further comprising establishing a connection in response to the connection request using the first type of wireless communication.

13. The method of claim 8, further comprising specifying the identification and sending a notification about the number of existing connections of the first type of wireless communication has reached the limit.

14. The method of claim 8, further comprising, upon a determination that the number of existing connections of the first type of wireless communication has not reached the limit, establishing a wireless connection in response to the connection request of the first type of communication.

15. The method of claim 14, wherein the first type of communication is Wi-Fi Direct and the second type of communication is Bluetooth.

* * * * *